May 9, 1933.   F. A. PARSONS   1,908,534
TRANSMISSION AND CONTROL MECHANISM
Filed Feb. 25, 1929   3 Sheets-Sheet 1

INVENTOR

May 9, 1933.  F. A. PARSONS  1,908,534
TRANSMISSION AND CONTROL MECHANISM
Filed Feb. 25, 1929  3 Sheets-Sheet 2

INVENTOR
Fred G. Parsons

Patented May 9, 1933

1,908,534

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

TRANSMISSION AND CONTROL MECHANISM

Application filed February 25, 1929. Serial No. 342,580.

This invention relates to transmission and control mechanism and more particularly to such mechanism for machine tools and similar use.

A purpose of the invention is to provide an improved transmission and an improved control therefor, and an improved combination of such transmission and control with a machine tool, more especially a milling machine.

Other purposes relate to transmission which is in part fluid operated and to an improved control thereof, particularly of the fluid operated portion.

Other purposes relate to improvements in a transmission having a fluid operated portion, and to control means for maintaining the rate of a member driven therefrom substantially constant in spite of variations in fluid leakage caused by variations in load resistance or fluid temperature, or viscosity, etc.

Other purposes relate to improvements in a transmission having a fluid operated portion capable of adjustment for a change in rate of a driven member, and to control means for adjusting such portion, and to means for maintaining substantially constant the rate pre-selected by such adjustment in spite of the variations in fluid leakage previously mentioned.

Other purposes relate to means for selective operation of a transmission, either to maintain a feed rate in spite of variations in load resistance, or to permit such variations to cause substantially corresponding variations in the fee rate.

Other purposes are generally to simplify and improve the construction and operation of transmission and control mechanisms, particularly for machine tools such as milling machines, and still other purposes will be apparent from this specification.

The invention consists of the construction, and combination of parts herein illustrated, described and claimed, and in such modification of the structure illustrated and described as may be equivalent to the claims.

In the drawings, the same reference characters have been applied to the same parts in each of the views, of which.

Figures 1, 4, 5:
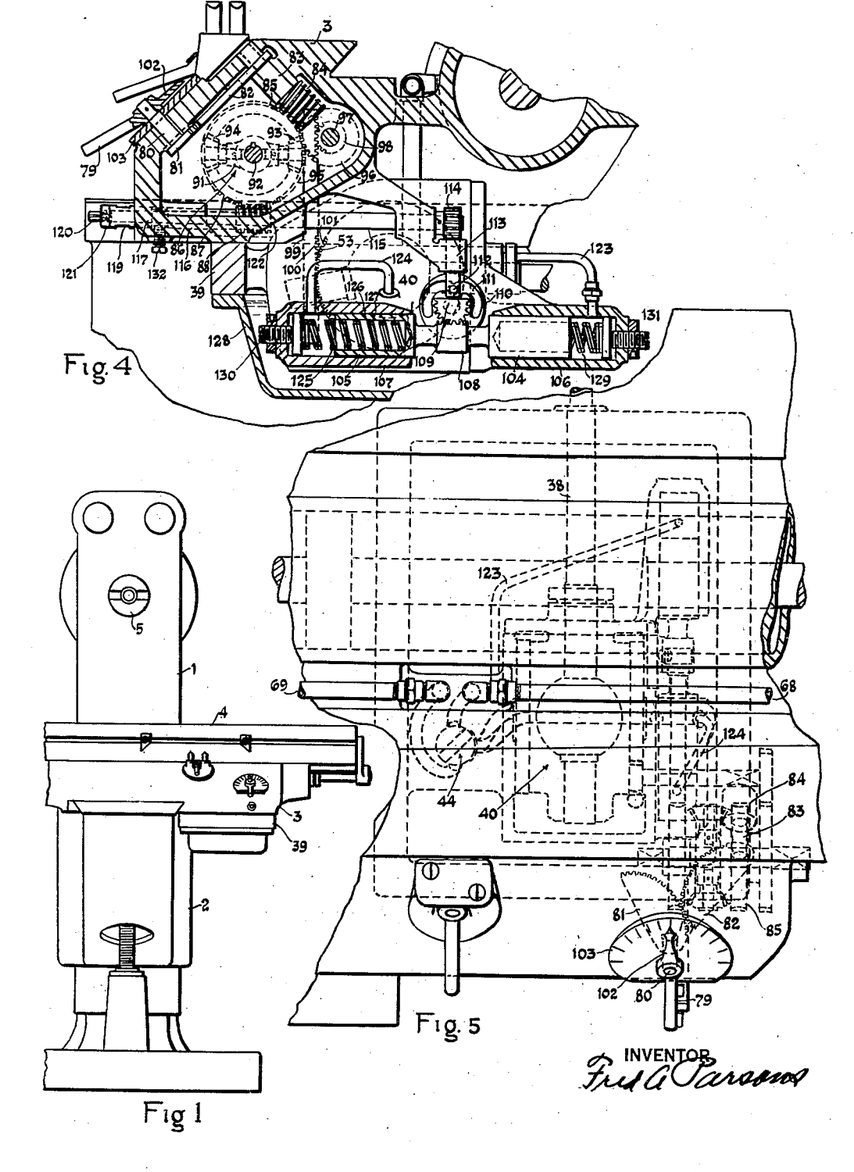
Fig. 1 is a partial front elevation of a milling machine which includes the invention.
Fig. 4 shows a partial vertical section taken along line 4—4 of Fig. 2.
Fig. 5 shows a plan view of the structure shown in Fig. 2, the table there shown being removed for clearness.

The machine shown includes a column or support 1, a knee or support 2 vertically slidably guided thereon, a saddle or support 3 guided on the knee for horizontal movement toward or from the column, and a table or work support 4 guided on the saddle for movement to right or left in Fig. 1.

A tool spindle or tool support 5 is rotatably journaled in column 1 and the structure described is such as to provide relative bodily movement between spindle 5 and table 4 in three mutually transverse paths.

Figures 6, 7:
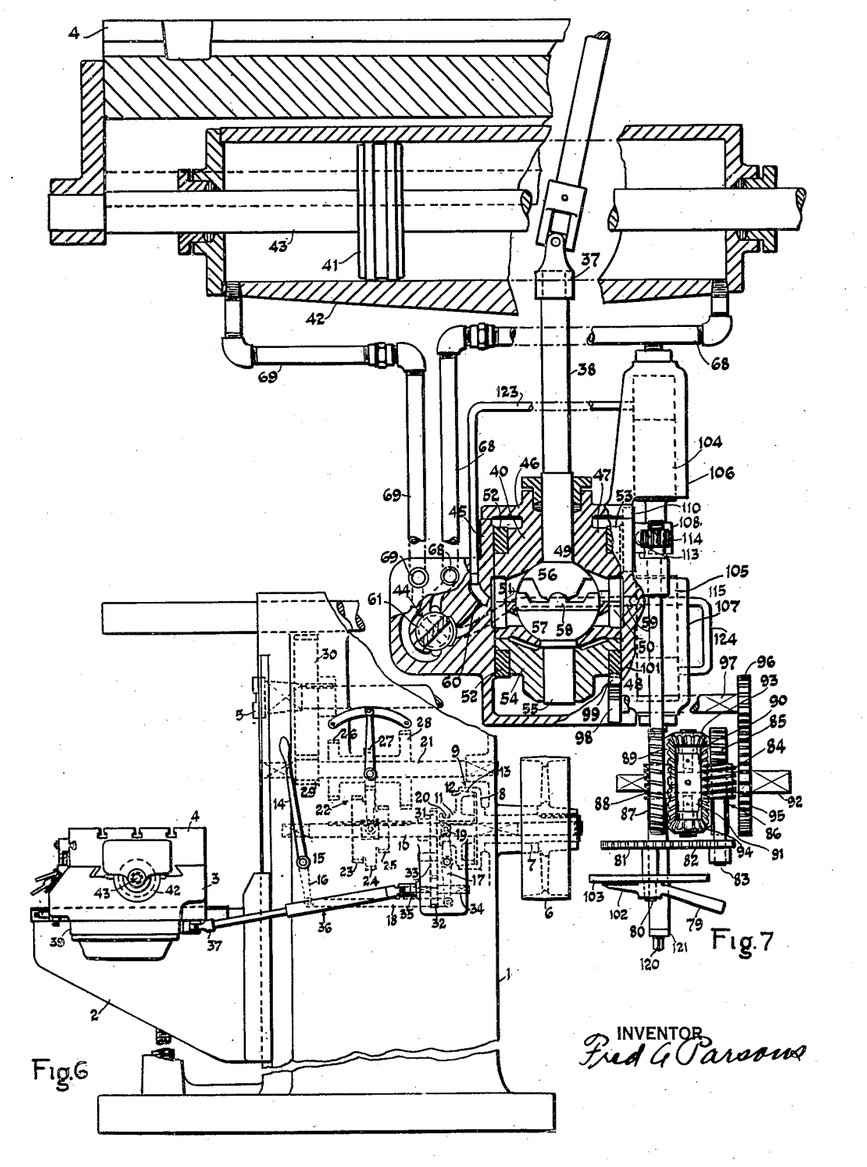
Fig. 6 is a partial side elevation of the milling machine shown in Fig. 1.
Fig. 7 is a diagrammatic view of certain of the transmission and control mechanism of the above machine, arranged to show operating relationship rather than the relative position of the parts.

A transmission is provided for spindle 5 as follows:

A pulley 6, Fig. 6, adapted to be actuated from a suitable exterior power source, provides a power source for the milling machine. Pulley 6 is fixed on a sleeve 7 upon which is also fixed a member 8 of a clutch generally denoted by the numeral 9. A shaft 10 has slidably keyed therewith a sleeve 11 upon which is fixed another clutch member 12, the members 8—12 having complementary friction faces at 13 which may be engaged or disengaged by movement of sleeve 11.

Sleeve 11 may be moved for such purposes by the means of a hand lever 14 fixed on a shaft 15 upon which is also fixed a lever 16 which moves a pivoted lever 17 by the means of a rod 18 having a pivoted engagement with the levers. Lever 17 provides a pivoted shoe 19 engaging an annular groove 20 in the sleeve 11.

The shaft 10, which may be connected or disconnected from the power source by the mechanism described, drives a shaft 21 through a rate changer generally denoted by the numeral 22, Fig. 6, and consisting in this instance of different diametered gears 23—24—25 fixed together and slidably keyed with shaft 10 for movement to engage one at a time with complementary gears 26—27—28 fixed on the shaft 21. Shaft 21 drives spindle 5 through a pinion 29 fixed on the shaft and a gear 30 meshed with the pinion and fixed with the spindle.

A feed train for power movement of table 4 is driven from the spindle train at a point between the clutch 9 and the rate changer 22, as follows:

Fixed on shaft 10 is a gear 31, Fig. 6, which drives a gear 32 through an idler 33. Gear 32 is fixed on a shaft 34 upon which is also fixed the driving member 35 of an extensible universal joint shaft of well known construction and generally denoted by the numeral 36. The driven member 37 thereof, Figs. 3—6—7, is fixed on a shaft 38 journaled in a housing 39 fixed on saddle 3, and drives a fluid pump generally denoted by the numeral 40. A fluid motor for movement of table 4 from pump 40 consists in this instance of a piston 41, operating in a cylinder 42 and having a piston rod 43 extending out of the cylinder at each end thereof, and fixed at one or both ends with the table. The motor is operable from pump 40 through a reverser valve generally denoted by the numeral 44, Figs. 2—5—7.

Pump 40 may be of any suitable form, but as here shown is of a construction similar to that fully shown and described in a United States Patent No. 1,678,050, issued July 24, 1928, and will therefore be only briefly described.

The pump is retained within a substantially closed casing 45, Figs. 3-7, fixed with housing 39 and having a removable cover portion 46 carrying a pump housing member 47. Removably fixed thereon is a pump housing member 48. Portions of the housing members form trunnions respectively on opposite sides of a spherical chamber 49 having its center coinciding with the axis of shaft 38. Ports 50—51, respectively for suction and exhaust, communicate with the chamber 49 through the trunnions. The trunnions mentioned support ring members 52—53 fixed with a member 54, whereby the rings and member form a unit supported and guided for movement about an axis passing through the center of the spherical chamber 49 and at right angles to the axis of shaft 38. Journaled in member 54 is a shaft 55 having its axis at right angles to the axis about which member 54 moves and passing through the center of the spherical chamber in any position of member 54.

Figure 3:
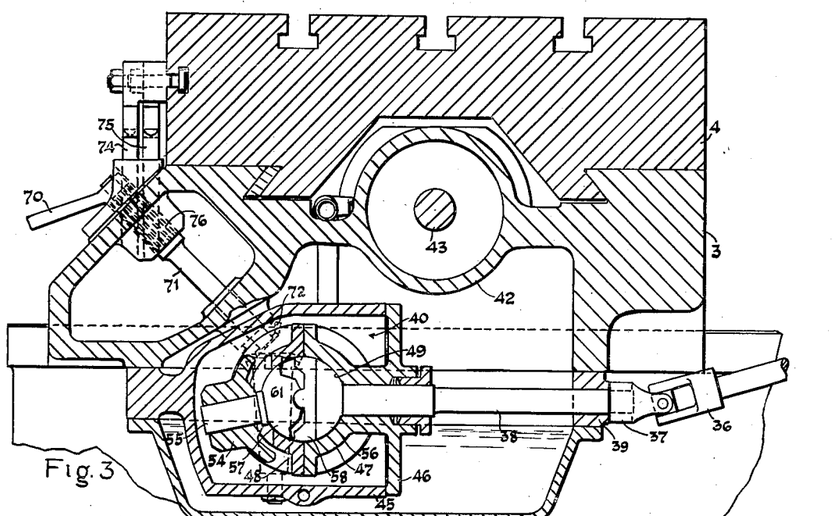
Fig. 3 is a vertical section taken along line 3—3 of Fig. 2.

Fixed on shafts 38—55 respectively are members 56—57. An intermediate member 58 is pivoted both with member 56 and member 57, the respective pivots being at right angles to one another and each passing through the center of the spherical chamber.

Member 56, driven from shaft 38, drives the intermediate member 58, which in turn drives member 57 and shaft 55, and the arrangement is such that when member 54 is adjusted for shaft 55 to stand at an angle relative to shaft 38 there are formed within the spherical chamber four separate substantially closed chambers each of which is alternately expanded and contracted during each revolution of the parts, and each of which is positioned by such rotation to communicate during expansion with the suction or inlet port 50, and during contraction with the pressure or outlet port 51 whereby fluid is forced through the pump. The amount of volume change of the chambers during rotation and therefore the rate of fluid delivery from the pressure port is dependent upon the adjustment of member 54; being zero when the member is adjusted for shaft 55 to be in axial alignment with shaft 38, whereby the position of adjustment of the member and shaft will determine the rate at which the piston rod 43 is moved, and the table rate may be changed while maintaining the drive shaft 38 at a constant speed.

Figures 2, 2A, 2B:
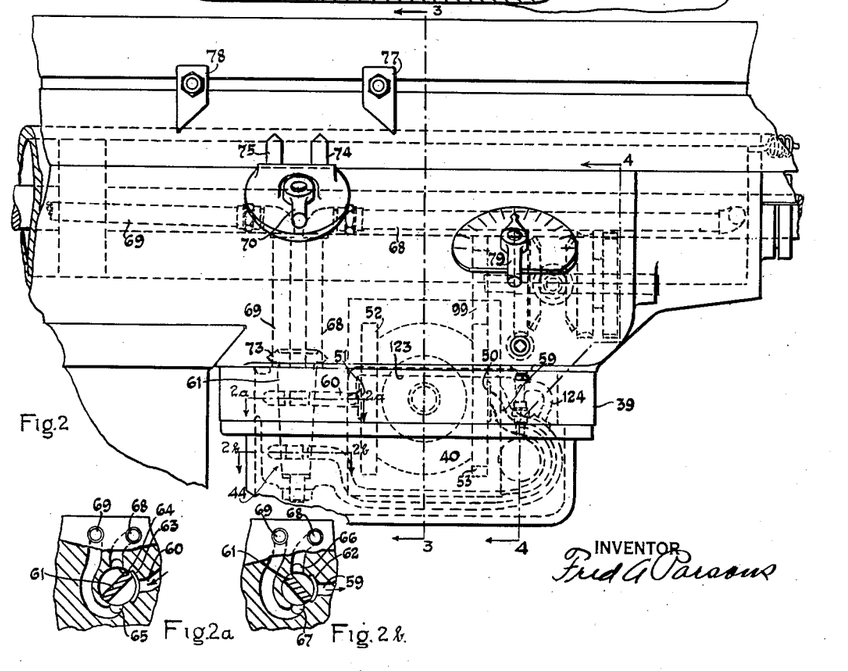
Fig. 2 is an enlarged front elevation of a portion of the same machine.
Fig. 2a shows a section taken along line 2a—2a of Fig. 2.
Fig. 2b is a section taken along line 2b—2b of Fig. 2.

The channels leading from pump 40 to the cylinder 42 are as follows: Referring to Figs. 2—2a—2b—7, the pump ports 50—51 respectively open into closed channels 59—60 which lead to ports adjacent the movable stem 61 of reverser valve 44. The channel 59 terminates in a port 62, Fig. 2b, and channel 60 terminates in a port 63, Fig. 2a. The ports 62—63 are respectively adjacent the opposite ends of the movable valve stem 61. Adjacent to port 63 are ports 64—65 and adjacent to port 62 are ports 66—67. The ports 64—66 each communicate with a pipe or channel 68 leading to the right end of the cylinder 42, Fig. 7, while the ports 65—67 each communicate with a channel or pipe 69 leading to the left end of the cylinder. The direction of rotation and all adjustments of pump 40 are such that fluid is expelled through pump port 51, and valve stem 61 is cut away as shown in Figs. 2a—2b to lead the fluid when the valve is in the position there shown, from pump port 51 through channel 60, and valve port 63, through the valve stem to valve port 65 and through channel 69 to the left end of the cylinder to move piston 41 and table 4 to the right. At the same time the cut away valve portions connect the channels for the fluid from the right end of the cylinder in Fig. 7 to be expelled through channel 68, valve ports 66 and 62, channel 59 to the pump inlet port 50. If the valve stem 61 is turned one-quarter turn from the position shown in Figs. 2a—2b, the connection of the pump inlet and outlet ports with the cylinder will be reversed and the table will move in the other direction. The ports 62—63 are made relatively large in order that an intermediate position of the valve stem will simultaneously open both ports 62—63 to both channels 68—69 in which case the ports 62—63 will communicate with one another, thus by-passing pump 40 to stop the table. In such case the channels 68—69 are also freely connected, thus by-passing the fluid from one side of the piston to the other, whereby the table when not connected with its transmission may be moved by suitable manual means (not shown).

The valve stem 61 may be shifted to effect either direction of table travel or to bring the table to a stop by the means of a hand lever 70, Figs. 2—3, fixed on a shaft 71, upon which is also fixed a bevel gear 72, engaging a bevel gear 73 fixed on the valve stem. The valve stem may also be shifted to neutral or intermediate position at a predetermined position of table movement by the means of plungers 74—75, respectively on opposite sides of the shaft 71 and engaging suitable angular rack teeth on the plungers with gear teeth 76 on the shaft. The relation is such that movement of shaft 71 to engage either direction of table travel moves one of the plungers 74—75 upwardly, and in the course of the resulting table travel the plunger may be contacted by the one or the other of dogs 77—78 adjustably fixed on table 4, the plungers and dogs having complementary angular surfaces adapted to move the plunger back down again to position valve stem 61 in a motion interrupting position.

Pump 40 may be adjusted manually to determine the rate of table travel by the means of the following mechanisms. A hand lever 79, Figs. 2—4—5—7, is fixed on a shaft 80. Also fixed on shaft 80 is a gear 81 engaging a gear 82 fixed on a shaft 83. Fixed on shaft 83 is a worm 84 engaging a worm wheel 85 which forms a member of a differential device generally denoted by the numeral 86 and which includes the worm wheel 85, another worm wheel 87 normally prevented from movement by its engagement with a worm 88, a plurality of bevel gears 89—90 fixed with the different worm wheels respectively, a frame or spider 91 fixed on a shaft 92 upon which the wheels 85—87 are rotatably supported, and bevel pinions 93—94 each rotatably carried by frame 91 and each engaging both bevel gears 89—90. The arrangement is such that worm 84 may turn shaft 92 through the differential mechanism 86. Fixed on shaft 92 is a gear 95 engaging a gear 96 fixed on a shaft 97 upon which is also fixed a gear 98 engaging suitable rack teeth in a plunger or rod 99 having rack teeth 100 engaging suitable teeth 101 on the periphery of the pump ring 53. By the means of the described mechanism the pump members may be relatively adjusted from hand lever 79 to vary the volume of pump flow.

A pointer or indicator 102, Figs. 4—5—7, is movable relative to a chart or dial 103, in accordance with the movement of lever 79, the pointer being in this case fixed with the lever.

The chart or dial 103 is preferably graduated to visibly indicate rates of table travel which result from a given position of the hand lever 79. The construction of pump 40 is such that equal increments of pump adjustment increase the table rate in substantially arithmetical progression whereby the change of rate is relatively large at small pump adjustments. The gears 81—82 are, however, constructed of an irregular form such that the rate determining means, including the lever 79 and the pointer and chart for visibly indicating the rate, operate in the manner of a geometrical progression, whereby the change of table rate is relatively small at small settings. This results in greater accuracy of adjustment at the smaller settings and in a variety of other advantages in operation. Among such other advantages it may be mentioned that the arrangement shown gives a greater mechanical advantage or leverage for the manual adjustment at the lower ranges. This is desirable because the heavy cutting with consequent high fluid pressures is ordinarily done at the lower table rates, whereby the pump is ordinarily more difficult to adjust through the lower ranges.

The actual rate of table movement will, unless prevented, vary somewhat from the dial reading in accordance with the rate of leakage through the pump and motor from the high pressure to the low pressure side of the fluid system. The majority of such leakage takes place in the pump. Such leakage in a system as shown is substantially proportional to the difference in pressure between the high and low pressure portions of the system as long as the fluid temperature and therefore its viscosity remains constant. Or if such difference of pressure remains constant then the leakage varies substantially in accordance with the change in fluid viscosity resulting from change in temperature. In either event the leakage is substantially independent of the position of adjustment of the pump.

In a transmission such as shown the fluid is in intimate contact with the mechanical elements which tend to generate heat, and the difficulties of providing in a machine of this sort adequate means for maintaining the fluid at constant temperature, result in considerable changes in fluid temperature and viscosity. A machine in which the transmission is originally at room temperature may, after a run under heavy load, develop sufficient heat in the transmission fluid that the feed rate is reduced to only one-half or less of the original rate unless means are provided to prevent such result.

In the present machine means are provided to maintain the feed rate substantially constant, by automatically increasing the flow of fluid to make up the fluid leakage. In part, such automatic means is controlled from the pressure caused by the load resistance and in part controlled from the temperature of the fluid, the mechanism being as follows:

Two oppositely acting pistons 104—105, Figs. 4–7, are actuated from cylinders 106—107 respectively, and may actuate the shaft 92 of differential device 86 through a common rod 108 having rack teeth engaging a segment fixed on a shaft 109, upon which is also fixed a cam 110 having a cam groove 111 engaging a suitable follower such as a pin or stud 112 fixed in a plunger 113 having suitable rack teeth engaging a gear or segment 114 fixed on a shaft 115. Shaft 115 carries the worm 88 co-axial therewith and adjustable for altering the relative positions of rotation by the means of a sleeve 116 extended outside saddle 3 together with the end 117 of shaft 118, there being a flattened portion 119 on the sleeve and a squared end 120 on the shaft to receive wrenches for such adjustment and a lock nut 121 for rigidly clamping worm 88 against a shoulder 122 when suitably adjusted. The worm 88 moves shaft 92 through the worm wheel 87, bevel gear 89, bevel gears 94—93 and the frame or spider 91 fixed on shaft 92.

Movement of shaft 92 will in such cases result in adjustment of pump 40 through connecting mechanism previously described but independently of the previously described adjustment from lever 79 and without movement of the indicator pointer 102.

The cylinder 106 is connected by means of a channel or pipe 123 to receive fluid from the channel 60, while cylinder 107 is connected through a channel or pipe 124 to receive fluid from the channel 59. Channels 60—59 are normally and except as later noted, respectively high pressure and low pressure channels, irrespective of changes in the direction of table feed brought about by shifting the reverser valve 44. Thus in the usual operation of the machine the piston 105 is urged to the left in Fig. 4 against the resistance of a spring 125, and will move until the total pressure against the piston area balances the spring pressure. The spring is of a construction such that a change in temperature thereof changes the resistance to a given deflection, this being accomplished by making the spring coils of wire or rod composed of two different materials, integrally joined, and having different coefficients of thermal expansion, and so positioned in the finished spring that the spring has less resistance as the temperature increases, whereby at high temperature there is required a greater movement of piston 106 to balance a given pressure of fluid in the channel 60 and vice versa. Different forms of spring construction may be used. In one form the mean diameter changes with the temperature, in another the length changes. In either event the resistance changes and may be made to increase or decrease with an increased temperature by reversing the relative position of the different metals composing the spring. The spring 125 is in close heat transmitting contact with the fluid of pump 40, and to further equalize the temperature of the spring and pump, they are both submerged in fluid in a reservoir generally denoted as 128, Fig. 4. The motion transmitting connections from rod 108 to pump 40 are such that movement as described adjusts pump 40 to a greater capacity. Cam groove 111 is of such form that taken in combination with the other connections the pump movement is just sufficient to increase the pump capacity to compensate for the leakage at the various operating pressures when the fluid is at a predetermined temperature whereby spring 125 is of a corresponding resistance. The construction of spring 125 is as previously explained such as to decrease its resistance proportionately as the temperature increases and vice versa whereby to change the pump movement from cylinder 106 by an amount just sufficient to provide correct leakage compensation at other temperatures. A spring 129 balances spring 125 and may be of ordinary construction or of bi-metallic construction to supplement the effect of spring 125.

It is not advanced that such compensation could be extended indefinitely over all possible ranges of feed rate, or pressure and temperature variations, but it will be apparent that, through predetermined or normal ranges, the leakage can be made of greatly lessened effect or the effect completely eliminated whereby to maintain a substantially constant feed rate.

Screws 130—131, Fig. 4, are provided for the purpose of adjusting the springs 125—129 to balance one another and retain piston rod 108 in a predetermined central position except as shifted as described.

The adjustment of worm 88 relative to shaft 115, previously described, is in part for purposes of initial adjustment in assembling the mechanism and in part for the purpose of permitting a variety of fluids to be used in the transmission. Different fluids may be of somewhat different viscosity at a given temperature, whereby the device if adjusted to operate satisfactorily with the one might not produce the desired feed rate with the other. In such case, the nut 121 is loosened and the pump adjusted through sleeve 116, worm wheel 87, etc., until the desired rate is produced, after which the worm is again clamped with the shaft.

It is sometimes desirable to operate the machine without the automatic compensation for leakage. For such operation, there is provided means for preventing movement of the worm 88, consisting of a lock screw 132 in the saddle and operable against sleeve 116 to prevent rotation thereof.

When the worm 88 is thus prevented from movement, the transmission is operable exactly as if there were no compensating devices present in the machine.

Channels 123—124, although shown of relatively large size, may in practice be of restricted area, whereby fluid movement therethrough is relatively slow. This will avoid any cushioning or retarding of table movements by the movement of pistons 104—105.

For purposes of convenience and simplicity the rapid traverse transmission ordinarily used on a milling machine for well known purposes and in a variety of well known forms, has not been shown in the drawings. It is to be understood, however, that there is contemplated a suitable form of rapid traverse transmission suitably combined with the feed transmission here shown and alternatively available for the non-cutting or idle movements of table 4.

It is also to be understood that the feed transmission here shown is contemplated for movement of other supports of the machine, such as saddle 3 or knee 2, or both. In such case, the driving trains may be individual to the different supports and each of the form similar to that here shown for table 4, or certain portions of the transmission or compensating devices for the one support may be utilized for two or more supports.

It is to be noted that the compensating effect brought about by the mechanism described operating directly on the feed control pump 40 may equally effectively result from a similar shifting mechanism operating on a pump provided specifically for such purposes. Also, in some case, the compensating devices could be applied to adjust the motor instead of the pump using, in such case, an adjustable volume motor of suitable type, such for instance as a rotary motor of a construction similar to the pump here shown.

What is claimed is:

1. In a machine tool, the combination of a movable member, a transmission therefor including a fluid motor, a fluid supply source and a pressure channel connecting said source and motor, means adjustable to change the volume of fluid delivered from said source to said motor whereby to establish a preferred rate of motor actuation, an inlet channel to said source, an outlet channel from said motor, a device shiftable in accordance with change in pressure in some of said channels, and means operative from said device to supplement the rate effective of said adjustable means in a manner operative to substantially maintain said preferred rate in spite of variations in some of the operating conditions of said machine tool.

2. In a machine tool, the combination of a movable member, a transmission therefor including a fluid motor and an adjustable pump for actuating said motor, means for adjusting said pump in accordance with the resistance to movement of fluid delivered therefrom, and means for altering the effect of said pump adjusting means in accordance with the temperature of said fluid.

3. In a machine tool, the combination of a movable member, a transmission therefor including a hydraulically operable portion in part adjustable for changing the rate of member movement, said portion including a fluid channel, a device having a plurality of elements each independently movable for the adjustment of said part, manual means for the movement of one of said elements to adjust said part to a position normally productive of a desired rate of member movement, and means operable in accordance with pressure variations in said channel for the movement of the other of said elements to further adjust said part.

4. In a machine tool, the combination of a movable member, a transmission therefor including a hydraulically operable portion in part adjustable to change the rate of member movement, a device having a plurality of elements each independently movable for the adjustment of said part, and a plurality of means for the adjustment of said part and operable through different of said elements respectively, one of said means being operable in accordance with variations in the temperature of fluid within said hydraulically operable portion.

5. In a machine tool, the combination of a movable member, a hydraulic transmission therefor and in part adjustable for changing the rate of member movement, and means for adjustment of said part including an element movable from the fluid pressure of said transmission, and means for altering the effect of said fluid pressure on said element in accordance with variations in the temperature of fluid in said transmission.

6. In a machine tool the combination of a movable member, a hydraulic transmission therefor and in part adjustable for changing the rate of member movement, and means for adjustment of said part including a plunger movable from fluid derived from said transmission and spring means opposing the movement of said plunger, said spring means being constructed to substantially alter said opposition during changes in temperature thereof and positioned in intimate heat transferring relationship with said transmission.

7. In a machine tool, the combination of a movable member, a hydraulic transmission therefor and including a pump adjustable in opposite directions respectively to increase or decrease the fluid delivery volume thereof, an element connected for movement proportionate to the fluid pressure set up in said transmission, and a train connecting said elemet for adjustment of said pump in directions to increase the volume thereof when said fluid pressure is increased and vice versa.

8. A machine tool as specified in claim 7, including means controlled from the temperature of said transmission for further adjustment of said pump, and connected for an increase of said temperature to adjust said pump in a direction to increase the flow thereof, and vice versa.

9. In a machine tool, the combination of a movable member, a transmission therefor including a hydraulic portion in part adjustable for changing the rate of said member, motion transmitting connections including a plurality of elements each independently movable for adjustment of said portion, means for movement of one of said elements to adjust said portion to positions normally selective of desired rates of member movement under certain operating conditions of said machine tool, and other means operative through the other of said elements to adjust said portion in accordance with variations in some of said operating conditions, said other means including a portion adjustable to alter the effect of said variations in operating conditions.

10. In a machine tool, the combination of a movable member, a hydraulic transmission therefor including an adjustable portion, a device responsive both to variations in fluid pressure in said transmission and to variations in the temperature thereof, and motion transmitting connections from said device for the adjustment of said adjustable portion.

11. In a milling machine, the combination of a rotatable tool spindle, a support movable in a path transverse to the spindle axis, a spindle transmission including in the order recited a power source, a rate changer, and said spindle, a support transmission connected to be driven from said spindle transmission to exclude said rate changer and including in the order recited a fluid pump, a fluid channel, a fluid motor and said support, means associated with said support transmission and adjustable to change the rate of support movement, an outlet channel from said motor, an inlet channel to said pump, a device shiftable in accordance with a change in pressure in some of said channels, and means operative in accordance with fluid pressure from said device to maintain the rate of support movement substantially as selected by said adjustable means in spite of variations in resistance to such movement.

12. In a milling machine, the combination of a rotatable tool spindle, a support movable relative thereto in a path transverse to the spindle axis, a spindle transmission including a power source, a support transmission driven from said spindle transmission and including in the order recited a fluid pump adjustable for changing the rate of support movement, valve means for reversing the direction of support movement, a fluid motor and said support, means for manual adjustment of said pump to a position productive of a desired rate of movement of said support against a certain resistance to support movement, and means operative from fluid pressure derived from said transmission at a point between said pump and said reverser valve for further adjusting said pump.

13. In a machine tool, the combination of a movable member, a transmission therefor including a hydraulic portion in part adjustable for changing the rate of member movement, and control means for said transmission including manual means for adjusting said portion for a variety of rates of member movement, and automatic means operative to alter the adjustment of said portion in accordance with variations in fluid pressure within said hydraulic portion.

14. In a machine tool, the combination of a movable member, a transmission therefor including a hydraulic portion in part adjustable for changing the rate of member movement, and control means for said transmission including manual means for adjusting said portion for a variety of rates of member movement, a temperature responsive device including a movable element, and means operative to alter the adjustment of said portion in accordance with the movement of said element.

15. In a machine tool, the combination of a movable member, a transmission therefor including a hydraulic portion in part adjustable for changing the rate of member movement, and control means for said transmission including manual means for adjusting said portion for a variety of rates of member movement, a temperature responsive device, a pressure responsive device, and means operative simultaneously from each of said devices to alter the adjustment of said portion.

16. In a milling machine, the combination of a rotatable tool spindle, a work table movable in a path transverse to the axis of said spindle, a transmission for said spindle including a power source associated with said machine, a transmission for said table and driven from said power source, said table transmission including a hydraulic portion in part adjustable for changing the rate of table movement in said path, manual means for adjusting said portion for a predetermined rate of table movement, and a device automatically operative to adjust said portion in accordance with variations in fluid pressure in said hydraulic portion whereby to substantially maintain said predetermined rate in spite of variations in resistance to table movement, said automatic device being operative to adjust said portion in a direction to increase the table rate when the fluid pressure increases and vice versa.

17. In a milling machine, the combination of a rotatable tool spindle, a work table movable in a path transverse to the axis of said spindle, a transmission for said spindle including a power source associated with said machine, a transmission for said table and driven from said power source, said table transmission including a hydraulic portion in part adjustable for changing the rate of table movement in said path, manual means for adjusting said portion for a predetermined rate of table movement, and a device automatically operative to adjust said portion in accordance with variations in the temperature of said hydraulic portion, said automatic device being operative in a direction to increase the table rate when the temperature increases and vice versa.

18. In a milling machine, the combination of a rotatable tool spindle, a work table movable in a path transverse to the axis of said spindle, a transmission for said spindle including a power source associated with said machine, a transmission for said table and driven from said power source, said table transmission including a fluid operable motor and a variable volume pump having a closed channel connection with said motor; and control means for said table transmission including a manually operable device for adjustment of said pump to a variety of positions productive of corresponding different rates of fluid delivery therefrom and a device automatically operative to change the adjustment of said pump in accordance with the fluid pressure within said closed channel, said automatic device being operative in a direction to increase the fluid delivery from said pump when the pressure of fluid within said channel increases and vice versa, whereby to maintain a predetermined rate of table travel in spite of variation in resistance thereto.

In witness whereof I have hereto affixed my signature.

FRED A. PARSONS.

CERTIFICATE OF CORRECTION.

Patent No. 1,908,534.  May 9, 1933.

FRED A. PARSONS.

It is hereby certified that error appears in the printed specification of the above numbered patent requiring correction as follows: Page 6, lines 69 and 70, claim 11, strike out the words "in accordance with fluid pressure"; and that the said Letters Patent should be read with this correction therein that the same may conform to the record of the case in the Patent Office.

Signed and sealed this 1st day of August, A. D. 1933.

M. J. Moore.

(Seal)  Acting Commissioner of Patents.